United States Patent Office 3,484,424
Patented Dec. 16, 1969

3,484,424
OLEFIN POLYMERIZATION PROCESS AND
CATALYST SYSTEM
Charles W. Moberly, Bartlesville, Okla., assignor to
Phillips Petroleum Company, a corporation of
Delaware
No Drawing. Filed Oct. 12, 1966, Ser. No. 586,034
Int. Cl. C08f 1/44
U.S. Cl. 260—93.7        10 Claims

ABSTRACT OF THE DISCLOSURE

Utilization of amino phosphorus halide compounds as adjuvants for the binary polymerization catalyst system containing a titanium trichloride-aluminum trichloride complex of the approximate formula $TiCl_3 \cdot \frac{1}{3}AlCl_3$ and an organoaluminum compound of the formula $R_nAlX_{3-n}$ wherein R is alkyl, cycloalkyl, aryl, or combinations thereof having up to 20 carbon atoms, X is a halogen and $n$ is 2 or 3, resulting in the production of polymers with improved properties such as greater flexural modulus and lower xylenes solubility.

---

This invention relates to the polymerization of olefins to form solid polymers. In one aspect it relates to improved catalysts for such a polymerization. In another aspect it relates to a process for producing solid polymers of olefins so as to obtain improved yield, improved polymer flexural modulus and/or improved xylenes-soluble content of the polymer.

Polymers of alpha-olefins, particularly of propylene, have long been known and numerous procedures have been disclosed for their production. These polymers are characterized by a greater or lesser degree of stereospecificity, i.e., the presence of a certain amount of a crystalline component frequently designated as isotactic polymer. Many of the useful properties of these polymers such as ultimate tensile, hardness, range of melting temperature, etc., appear to depend upon the stereospecificity of the polymer. Flexural modulus, a property readily measurable by standard procedures, provides a reliable and consistent means for characterizing these polymers. The higher the stereospecificity of a polymer, the higher the flexural modulus values are found to be. For a commercially attractive product, flexural modulus values must be high, preferably above 200,000 p.s.i. and more preferably above 225,000 p.s.i. Heretofore it has frequently been necessary to extract amorphous fractions of the polymer in order to provide products having flexural moduli in this range. It is therefore highly desirable to minimize the production of amorphous polymer, as measured for example by the amount of polymer soluble in mixed xylenes.

Another requirement for these polymerization procedures is a high level of productivity of polymer based on catalyst. The stereospecific catalyst systems used in these operations are expensive and cannot be regenerated. Thus, a high productivity in pounds of useful polymer per pound of catalyst is an important feature of any commercially attractive process.

An object of this invention is to provide an improved process for the production of olefin polymers.

Another object of this invention is to provide a polymerization process in which there is obtained an increase in polymer yield, an increase in flexural modulus and/or a decrease in the xylene-soluble content of the polymer.

A further object of this invention is to provide novel catalyst systems which when employed in a polymerization process results in the improving of the polymer yield, flexural modulus and/or xylenes-solubles of the resulting polymer.

Other aspects, objects and the several advantages of this invention will be apparent to those skilled in the art upon consideration of this disclosure.

According to my invention, I have discovered that 1-olefin polymers can be obtained in improved yields with increased flexural modulus and/or decreased xylenes-soluble content when the polymerization is conducted in the presence of an organometal modified catalyst system formed by admixing (A) an organoaluminum compound of the formula $R_nAlX_{3-n}$ where R is alkyl, cycloalkyl, aryl or combinations thereof having up to 20 carbon atoms, X is a halogen and $n$ is 2 or 3, (B) a titanium trichloride-aluminum trichloride complex resulting from the reaction of titanium tetrachloride and aluminum and having the approximate formula $TiCl_3 \cdot \frac{1}{3}AlCl_3$, and (C) an amino phosphorus halide compound.

The enumeration of alkyl, cycloalkyl and aryl radicals herein in defining the formulas is intended to include the various mixed radicals such as alkaryl, aralkyl, alkylcycloalkyl, cycloalkylaryl, and the like.

The compounds represented by the formula $R_nAlX_{3-n}$ and utilized as component (A) of the catalyst system are well known in the art. Examples are triethylaluminum, diethylaluminum chloride, and the like.

The titanium chloride-aluminum chloride complex utilized as component (B) of the catalyst system according to this invention is also well known in the art. It can be formed by reacting titanium tetrachloride with metallic aluminum. The complex can be represented by the formula $TiCl_3 \cdot \frac{1}{3}AlCl_3$.

The amino phosphorus halide compounds of this invention are those represented thus:

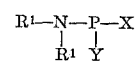

where Y can be

or X; X can be F, Cl, Br, or I; and $R^1$ can be H, alkyl, aryl, aralkyl, cycloalkyl, alkenyl, alkynyl, or combinations thereof, provided that no $R^1$ contains more than about 10 carbons and the total number of carbons in all $R^1$ groups does not exceed about 30.

The amino phosphorus halide compounds of this invention can be obtained from commercial sources or synthesized by conventional methods. I prefer to employ these compounds in molar ratios (moles $R^1{}_2NPYX$/moles $R_nAlX_{3-n}$) between 0.05 and 1.0, but ratios between 0.01 and 1.5 can be used. The $R_nAlX_{3-n}$ compound can be used in ratios (moles $R_nAlX_{3-n}$/moles $TiCl_3 \cdot \frac{1}{3}AlCl_3$) between 0.5 and 10, but ratios between 1 and 5 are preferred. The total catalyst concentration is usually preferred to be between 0.005 and 10 weight percent of the olefin(s) being polymerized, however, concentrations outside this range can be employed.

The polymerization reaction is carried out either in a mass system—i.e., the liquid propylene acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylcyclopentane, benzene, toluene, naphthalene, anthracene, and the like. Where an inert diluent is used, the volume ratio of diluent to propylene is in the range of 1:1 to 10:1, preferably 3:1 to 7:1.

The polymerization is conducted at temepratures in the range 80 to 250° F., preferably 100 to 200° F. The pressure is sufficient to maintain the reaction mixture substantially in the liquid phase. The reaction time is in the range 10 minutes to 75 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1-butene, 1-hexene, 4-methyl-1-pentene, and the like. Mixtures can also be used if desired.

Hydrogen to control the molecular weight of the polymer, in concentrations between about 0.08 and 0.50 mole percent of the propylene calculated as the amount present in the liquid phase, can also be employed. The tough, strong polymers formed by the process of this invention have wide application in contemporary plastics technology as is well known to the art.

The application of the process of this invention is demonstrated by the following examples, although it is not intended that the invention be limited thereto.

EXAMPLE I

In a series of runs, propylene was polymerized in a 1-liter, stirred reactor at 130° F. and 325 p.s.i.g. pressure. A total of 250 g. of propylene, 1 liter of hydrogen (equivalent to 0.69 mole percent hydrogen of the polypropylene present in the reaction system), and the amounts indicated of catalysts and adjuvants were charged to the reactor. Reaction time was 2.5 hrs. for runs 1 through 5, and was 0.27 hr. for run 6, the control run. At the end of the reaction, the polymerization mixture was cooled, the catalysts were killed with methanol, and impurities were extracted from the polymeric material in a conventional manner with methanol. The polymer was then molded for various tests to evaluate its properties. The following table summarizes the results:

|  | Run 1 | Run 2 | Run 3 | Run 4 | Run 5 | Run 6 |
|---|---|---|---|---|---|---|
| $R^1_2$NPYCl, g.[1] | 0.198 | 0.124 | 0.099 | 0.145 | 0.091 | 0.00. |
| Adjuvant | (Ayl)$_2$NPCl$_2$[8] | (Ayl)$_2$NPCl$_2$ | (Ayl)$_2$NPCl$_2$ | (Me)$_2$NPCl$_2$[9] | (Me)$_2$NPCl$_2$ | Control. |
| $R_n$AlX$_{3-n}$[2] | 0.233 | 0.228 | 0.232 | 0.228 | 0.228 | 0.201. |
| TiCl$_3$·⅓AlCl$_3$[3] | 0.204 | 0.208 | 0.203 | 0.200 | 0.205 | 0.114. |
| Rate, g./g./hr.[4] | 148 | 154 | 220 | 128 | 151 |  |
| Xylene solubility, percent[6] | 3.16 | 13.1 | 19.9 | 5.8 | 13.2 | 41.0. |
| Flexural modulus[5] | 200 | 128 | 108 | 214 | 127 | 30. |
| Density, gm./cc. | 0.9060 | 0.9002 | 0.8959 | 0.9070 | 0.9008 | 0.8829. |
| Shore D Hardness | 70 | 70 | 63 | 73 | 69 | 50. |
| Tensile strength[7] | 4,377 | 3,113 | 2,760 | 4,453 | 3,093 | 1,130. |

[1] $R^1_2$NPYCl, g.=wt. in gms. of adjuvant charged to the reactor.
[2] $R_n$ClX$_{3-n}$=wt. in gms. of triethyl aluminum charged to the reactor in all runs.
[3] TiCl$_3$·⅓AlCl$_3$, g.=wt. in gms. of TiCl$_3$·⅓AlCl$_3$ charged to the reactor in all runs.
[4] Rate, g./g./hr.=gms. of polymer formed/gm. TiCl$_3$·⅓AlCl$_3$/hr.
[5] Flexural modulus=ASTM 790-61.
[6] Xylene Solubility, percent=wt. polymer soluble in xylene (100)/wt. of total polymer.
[7] Tensile strength=lbs./sq. in.
[8] (Ayl)$_2$NPCl$_2$=Diallylaminophosphorus dichloride.
[9] (Me)$_2$NPCl$_2$=Dimethylaminophosphorus dichloride.

With increasing concentrations of the adjuvants of this invention the data presented clearly show a considerable improvement in properties as demonstrated by improved flexural modulus, xylene solubility, density, Shore D hardness, and tensile strength values. Clearly, superior polymers are produced.

EXAMPLE II

In a series of runs, propylene was polymerized in a 1-liter stirred reactor at 130° F. and 325 p.s.i.g. A total of 250 g. of propylene, 1 liter of hydrogen (equivalent to 0.69 mole percent hydrogen of the polypropylene present in the reaction system), and the amounts indicated of catalysts and adjuvants were charged to the reactor. Reaction time was 2.5 hrs. for runs 1 through 3. At the end of the reaction, the polymerization mixture was cooled, the catalysts were killed with methanol, and impurities were extracted from the polymeric material in a conventional manner with methanol. The polymer was then molded for various tests to evaluate its properties. The following table summarizes the results:

|  | Run 1 | Run 2 | Run 3 |
|---|---|---|---|
| $R^1_2$NPYCl, g. | 0.0145 | 0.00725 | None. |
| Adjuvant | (Me)$_2$NPCl$_2$ | (Me)$_2$NPCl$_2$ | Control. |
| DEAC, g. | 0.243 | 0.244 | 0.244. |
| TiCl$_3$·⅓AlCl$_3$, g. | 0.202 | 0.203 | 0.204. |
| Rate, g./g./hr. | 164 | 186 | 154. |
| Xylene solubility, percent | 3.6 | 3.8 | 5.2. |
| Flexural Modulus, p.s.i.×10$^{-3}$ | 257 | 251 | 209. |
| Density, g./cc. | 0.9103 | 0.9105 | 0.9073. |
| Shore D Hardness | 75 | 75 | 72. |
| Tensile Strength, p.s.i. | 4,940 | 4,663 | 4,223. |

The above data show improved flexural modulus by addition of the adjuvant.

In addition to the improvement in flexural modulus, xylene solubility was lowered, and tensile strength, density, hardness were improved.

Reasonable variations and modifications of this invention can be made, or followed, in view of the foregoing disclosure, without departing from the spirit or scope thereof.

I claim:
1. A catalyst system formed on admixing (A) a compound of the formula $R_nAlX_{3-n}$ wherein R is alkyl, cycloalkyl, aryl or combinations thereof having up to 20 carbon atoms, X is a halogen and $n$ is 2 or 3, (B) a titanium trichloride-aluminum trichloride complex having the approximate formula TiCl$_3$·⅓AlCl$_3$ and (C) an amino phosphorus halide compound of the formula

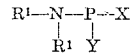

wherein Y is a member of the group consisting of

and X; X is a halogen and R$^1$ is hydrogen, alkyl, aryl, aralkyl, cycloalkyl, alkenyl, alkynyl or combinations thereof wherein no R$^1$ contains more than 10 carbon atoms and the total number of carbon atoms in all R$^1$ groups does not exceed 30, and wherein the molar ratio of said amino phosphorus halide compound to compound of the formula $R_nAlX_{3-n}$ is in the range of 0.01 to 1.5 and the molar ratio of said compound of the formula $R_nAlX_{3-n}$ to said titanium trichloride-aluminum complex is in the range of 0.5 to 10.

2. A catalyst according to claim 1 wherein said amino phosphorus halide is diallylamino phosphorus dichloride.

3. A catalyst according to claim 1 wherein said amino phosphorus halide is dimethylamino phosphorus dichloride.

4. A catalyst system according to claim 1 formed by admixing triethylaluminum, titanium trichloride-aluminum trichloride complex and diallylamino phosphorus dichloride.

5. A catalyst system according to claim 1 formed by admixing triethylaluminum, titanium trichloride-aluminum trichloride complex and dimethylamino phosphorus dichloride.

6. A process which comprises polymerizing an aliphatic 1-olefin having from 3 to 8 carbon atoms per molecule in the presence of a catalyst which forms on mixing a compound of the formula $R_nAlX_{3-n}$ wherein R is alkyl, cycloalkyl, aryl or combinations thereof having up to 20 carbon atoms, X is a halogen and $n$ is 2 or 3, (B) a titanium trichloride-aluminum trichloride complex having the approximate formula $TiCl_3 \cdot \frac{1}{3}AlCl_3$ and (C) an amino phosphorus halide compound of the formula

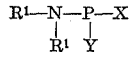

wherein Y is a member of the group consisting of

and X; X is a halogen and $R^1$ is hydrogen, alkyl, aryl, aralkyl, cycloalkyl, alkenyl, alkynyl or combinations thereof wherein no $R^1$ contains more than 10 carbon atoms and the total number of carbon atoms in all $R^1$ groups does not exceed 30, and wherein the molar ratio of said amino phosphorus halide compound to compound of the formula $R_nAlX_{3-n}$ is in the range of 0.01 to 1.5 and the molar ratio of said compound of the formula $R_nAlX_{3-n}$ to said titanium trichloride-aluminum trichloride complex is in the range of 0.5 to 10.

7. A process according to claim 6 wherein said catalyst is formed by admixing triethylaluminum, titanium trichloride-aluminum trichloride complex and diallylamino phosphorus dichloride.

8. A process according to claim 6 wherein said catalyst is formed by admixing triethylaluminum, titanium trichloride-aluminum trichloride complex and dimethylamino phosphorus dichloride.

9. A process according to claim 6 wherein the polymerization is carried out at a temperature in the range of 80 to 250° F. at a pressure sufficient to maintain the reaction mixture in the liquid phase.

10. A process according to claim 6 wherein hydrogen is present in a concentration of about 0.08 to 0.50 mole percent of olefin.

References Cited

UNITED STATES PATENTS

| | | | |
|---|---|---|---|
| 3,147,238 | 9/1964 | Winkler et al. | 260—93.7 |
| 3,147,240 | 9/1964 | Coover et al. | 260—93.7 |
| 3,213,073 | 10/1965 | Coover et al. | 260—93.7 |
| 3,219,648 | 11/1965 | Hill | 260—93.7 |
| 3,269,996 | 8/1966 | Langer | 260—93.7 |
| 3,389,129 | 6/1968 | Yamada et al. | 260—93.7 |

JOSEPH L. SCHOFER, Primary Examiner

E. J. SMITH, Assistant Examiner

U.S. Cl. X.R.

252—429; 260—88.2, 94.9